P. ROBIN.
METHOD OF MANUFACTURING DENTAL MODELS.
APPLICATION FILED DEC. 20, 1911.
1,055,357.
Patented Mar. 11, 1913.
2 SHEETS—SHEET 1.
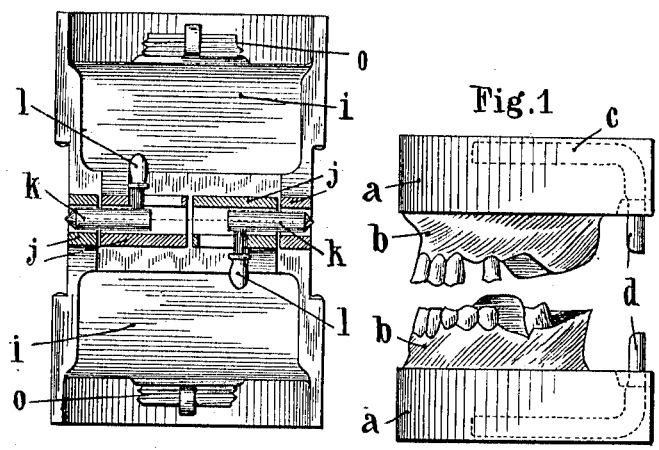

P. ROBIN.
METHOD OF MANUFACTURING DENTAL MODELS.
APPLICATION FILED DEC. 20, 1911.
1,055,357.
Patented Mar. 11, 1913.
2 SHEETS—SHEET 2.
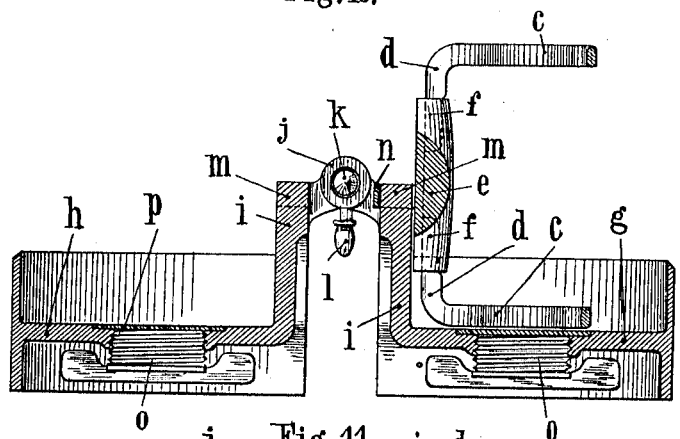
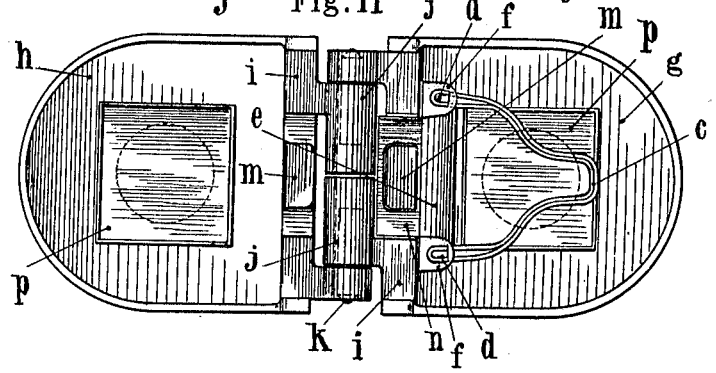
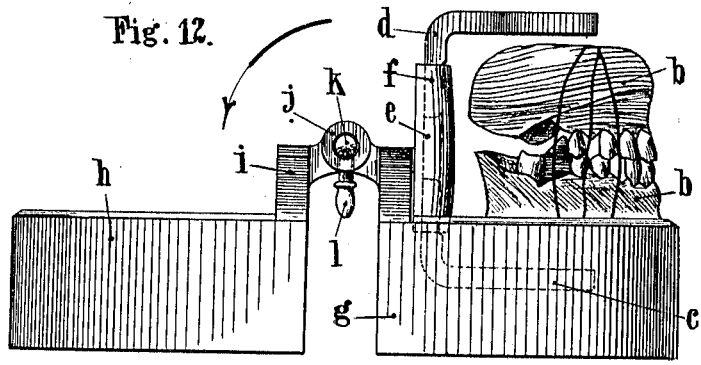

UNITED STATES PATENT OFFICE.

PIERRE ROBIN, OF PARIS, FRANCE.

METHOD OF MANUFACTURING DENTAL MODELS.

1,055,357.  Specification of Letters Patent.  Patented Mar. 11, 1913.

Application filed December 20, 1911. Serial No. 666,991.

*To all whom it may concern:*

Be it known that I, PIERRE ROBIN, a citizen of the Republic of France, residing at 24 Rue Mogador, Paris, in the French Republic, have invented certain new and useful Improvements in Methods of Manufacturing Dental Models, of which the following is a specification.

This invention has for its object a special method of manufacturing and jointing dental models representing the two maxillaries of one and the same jaw. Each of them is formed by a maxillary molding embedded in a plaster base. These bases are molded while metallic fitting with tail pieces or hooks are fixed by these hooks into an invariable H-shaped templet the models being maintained in their exact articulation by wax or wires. The liquid plaster employed for the manufacture in hardening fixes the models to their base and becomes molded on the templet insuring the mutual position of these parts in an immovable manner. The result is that the finished models are always jointed exactly when they are mounted upon a support which is the geometrical and mathematical reproduction of the templet and this without an adjusting screw and without guide marks either on the models or on the articulator.

All the templets and all the supports being geometrically and mathematically identical, any pair of models obtained in accordance with the invention will be in exact articulation when it is mounted on one of these supports.

The method of manufacture and forms of articulation in accordance with the invention are illustrated in the accompanying drawing, in which:—

Figure 1 is a side elevation of two dental models of one and the same mouth. Figs. 2 and 3 show in front elevation and in plan a metallic fitting or framework intended to be embedded in the plaster constituting the base of the model. Fig. 4 is a separate front elevation of the invariable H-shaped templet. Fig. 5 is a plan thereof. Fig. 6 shows two dental models of one and the same mouth mounted on a hinged support. Fig. 7 is a plan of this support. Figs. 8 and 9 represent a simplified support or ball joint articulation. Fig. 10 is a longitudinal section of a mold serving for the manufacture of the models. Fig. 11 is a plan thereof. Fig. 12 is a front elevation of the open mold. Fig. 13 is a rear elevation partly in section.

As shown in Fig. 1 each model is formed of a base $a$ in which the mold $b$ of the corresponding maxillary is embedded; a metallic fitting or framework $c$ with tail pieces or hooks $d$ which extend rearward of the base is embedded in the latter. The framework $c$ is formed by a strip of metal bent U-shaped. The proper position of the metallic fittings in the bases is obtained at the moment of casting the plaster by an invariable templet $e$ presenting the form of an H comprising tubular portions $f$ in which the tail pieces or hooks $d$ of the frames $c$ are fitted. The invariable templet insures the regular engagement of the teeth of the closed jaw by fixing the hooks or tail pieces of the fittings in a position which is the same for all models, during the hardening of the plaster.

In order to obtain the models comprising the two maxillaries of one and the same jaw for their regular engagement, the mold represented in Figs. 10 to 13 is used. This mold is constituted by two plates $g$ and $h$ the interval between which is obtained by angle pieces $i$ jointed together and forming a stay. With this object each part $i$ of the stay integral with the corresponding plate comprises two lugs $j$ which are arranged opposite corresponding lugs in the second part; the connection of these lugs is effected by means of a hinge pin $k$ in two parts constituting bolts which are operated by means of handles $l$ sliding in slots formed in the lugs $j$; this hinge pin $k$ permits of opening the mold for casting the plaster. The two plates $g$ and $h$ integral with the lugs $j$ are exactly similar, which permits of manufacturing them with the same model; they are thus rendered interchangeable. The plates $g$ and $h$ are provided with an outer flange which forms a cup into which the plaster serving to form the base of the model is poured. Furthermore the angle pieces $i$ are stamped in such a manner as to form a hook $m$ in the axis of the mold and in each cup, the rigid H-shaped support $e$ being engaged on this hook by its median lug $n$, the vertical branches $f$ of this articulator holding the metallic frames $c$ intended to be embedded in the plaster in place by means of their tail pieces $d$.

In order to obtain the models comprising the two maxillaries of one and the same jaw in regular engagement, impressions of the two maxillaries should first of all be taken; they are molded in plaster in the ordinary manner and united in correct engagement by means of adhesive wax or wires, the lingual cavity being closed with wax or filled with crumpled paper.

In order to obtain the model of the lower maxillary the plate $f$ is used, the plate $h$ being rocked Fig. 12. The two hooks or tail pieces $d$ on one framework $c$ are engaged in the lower part of the branch $f$ of the rigid articulator which is then arranged in place on the hook $m$ and the mold is filled with a sufficient quantity of modeling plaster for obtaining the base, the upper framework $c$ not being arranged in the articulator $e$. The lower molding of the two maxillaries is then placed on this liquid plaster, united in the manner already stated, with the incisors in front, and the plaster is allowed to set; in this manner a block is obtained which constitutes the model of the lower maxillary.

In order to obtain the model of the upper maxillary, the hooks $d$ of a framework $c$ are arranged in the upper part of the branches of the H (Fig. 12); the portion $h$ of the mold is filled with liquid plaster and the mold $g$ is caused to pivot on the mold $h$ in the direction indicated by the arrow in such a manner that the molding in plaster of the upper maxillary enters the liquid plaster arranged in the part $h$ of the mold. When this plaster has set the bolts $l$ are operated in such a manner as to render the two parts of the mold independent and the bases $a$ are removed from the mold in turning the screws $o$ which exert pressure on the small metal strips $p$ arranged in the bottom of each cup. The rigid templet is then separated from the moldings produced and two molded models are obtained each provided with two outer hooks $d$.

The mold described above might be formed in several detachable parts; in this case the hinge should be replaced by assembling pins permitting of the detachment of the several parts of the mold in order to facilitate the separating of the two models. For the subsequent fitting of the appliances to be constructed, the hooks $d$ are engaged in hinged supports as shown in Figs. 6 and 7.

The hinged support is formed by four tubes $q$ connected with the hinge pin $r$ by extensions $s$; the tubes $q$ maintain the hooks $d$ of the metal frames $c$ embedded in the bases of the models in their proper position. This mounting of the models provided with hooks upon an independent support permits of obtaining the articulation of models of any kind for operations in prothesis or orthodontia. An articulation termed a ball-joint articulation which is of a simpler kind is shown in Figs. 8 and 9. It permits of maintaining the models in engagement by locking the support if desired. It is formed by two tubes $t$ jointed together directly at $u$; the tail pieces or hooks $d$ of the fittings are engaged in these tubes and the models can be opened or closed. When it is desired to lock the two models together it is only necessary to rotate the joint as a whole through 90° which places the hinge $u$ in such a manner that the models can no longer move. In this manner the two models of one and the same mouth might be united temporarily by means of two tubes in which the hooks or tail pieces $d$ of the metallic frameworks would be engaged.

What I claim and desire to secure by Letters Patent of the United States is:—

1. A method of constructing dental models consisting in embedding plaster models of the two maxillaries of one and the same jaw in a plaster base, embedding metallic fittings in said base, and mounting the models by means of the metallic fittings on an independent support.

2. A method of constructing dental models consisting in embedding plaster models of the two maxillaries of one and the same jaw in a plaster base, embedding a metal framework in said base, holding said metal framework in position while the base is hardening by means of an appropriate shaped member, and mounting the finished model on a suitable support after the base has set and has been ejected from the mold.

3. A method of constructing dental models consisting in embedding plaster models of the two maxillaries of one and the same jaw in a plaster base, embedding a metal framework in said base said framework having its extremities turned up at right angles to the main portion, holding said framework in position until the cast sets by means of a tubular member, removing the models, and mounting them on a suitable supporting member.

4. A method of constructing dental models consisting in embedding plaster models of the two maxillaries of one and the same jaw in a plaster base, embedding a metal framework in said base said framework having its extremities turned up at right angles to the main portion and emerging from said base, holding the metal framework in position by means of a tubular member, removing the base from the mold, and mounting the model on a hinged support.

5. A method of constructing dental models consisting in embedding plaster models of the two maxillaries of the one and the same jaw in a plaster base, embedding a metal framework in said base said framework having its extremities bent up at right angles to the main portion and emerging from the base, holding said framework in position by means of a tubular member engaging the extremities of said framework until the plaster sets, removing the cast from the mold, and mounting said model on a hinged support.

6. A method of constructing dental models consisting in embedding plaster models of the two maxillaries of one and the same jaw in a plaster base contained in a mold constituted by two identical parts hinged together, embedding a metal framework in said base said framework having its extremities bent at right angles to the main portions and which project above the base, holding the metal framework in position by means of a tubular member which engages the extremities of said framework until the base sets, removing the models from the mold by means of a screw threaded member engaging in a correspondingly screw threaded hole at the base of said mold, and mounting the finished model on a hinged support.

7. A method of constructing dental models consisting in embedding plaster models of the two maxillaries of one and the same jaw in a plaster base contained in a mold constituted by two identical or box shaped elements hinged together by pins, embedding a metal framework in said base said framework having its extremities bent up at right angles to the main portion and which project above the upper surface of the base, holding the metal framework in position while the base sets by means of a tubular member which engages the said extremities and a hook shaped member on the side of the mold, removing the models from the mold by pressure applied to the lower surface of same by a screw threaded member engaging in a correspondingly screw threaded hole in the bottom of the mold, and mounting said model on a hinged support by engaging said extremities of the framework in corresponding recesses on the said hinged support.

In testimony whereof I affix my signature in presence of two witnesses.

PIERRE ROBIN.

Witnesses:
 BARTLEY F. YOST,
 MAURICE PICARD.

---

Copies of this patent may be obtained for five cents each, by addressing the "Commissioner of Patents, Washington, D. C."